US006333369B1

(12) United States Patent
Park et al.

(10) Patent No.: US 6,333,369 B1
(45) Date of Patent: Dec. 25, 2001

(54) COATING RESIN COMPOSITION FOR TRANSFER PRINTING

(75) Inventors: In-Hwan Park; Bong Keun Song; Jong Hak Kim, all of Daejeon; Bong Soo Chung, Seoul, all of (KR)

(73) Assignee: Korea Research Institute of Chemical Technology (KR)

( * ) Notice: Subject to any disclaimer, the term of this patent is extended or adjusted under 35 U.S.C. 154(b) by 0 days.

(21) Appl. No.: 09/673,613

(22) PCT Filed: Apr. 28, 1999

(86) PCT No.: PCT/KR99/00205

§ 371 Date: Oct. 19, 2000

§ 102(e) Date: Oct. 19, 2000

(87) PCT Pub. No.: WO99/55757

PCT Pub. Date: Nov. 4, 1999

(30) Foreign Application Priority Data

Apr. 28, 1998 (KR) .................................................. 98-15220

(51) Int. Cl.[7] .............................. C08K 5/01; C08L 63/02
(52) U.S. Cl. ..................... 523/454; 428/413; 428/417; 428/418; 523/456; 523/463
(58) Field of Search ..................................... 523/404, 454, 523/456, 463; 428/413, 417, 418; 101/177, 215, 217, 251

(56) References Cited

U.S. PATENT DOCUMENTS 6,040,040 * 3/2000 Rainbow ............................. 428/212

FOREIGN PATENT DOCUMENTS 24 24 949   12/1974 (DE).
237 840 A1   7/1986 (DE).
63 165 429   7/1988 (JP).

OTHER PUBLICATIONS

J. Appl. Polym. Sci., 10,1813 (1970), Tertiary Esters.
Polym. Eng. Sci., 16, 353 (1976) Esters of 'Boric Acid.
J. Polym. Sci., C., 23, 765 (1968), Lewis acids, organometallic compounds.
J. Polym. Sci. A–1., 8, 593 (1970), Organic acid metallic salts.
Appl. Polym. Sci., 11, 1009 (1967), Imidazoles.

* cited by examiner

Primary Examiner—Robert Dawson
Assistant Examiner—D. Aylward
(74) Attorney, Agent, or Firm—Finnegan, Henderson, Farabow, Garrett & Dunner, LLP

(57) ABSTRACT

The present invention relates to an epoxy-based coating resin composition which facilitates the transcription of the printed letters or photographs developed by sublimation dyes on printing paper to the surface of potteries, glasses, marbles, metals or woods only by thermal treatment and more particularly, to the epoxy-based coating resin composition with 1) long-tern storage stability due to the use of a mixture of diethanolamine and triethanolamine as a hardening accelerator, 2) uniform thickness after coated, 3) less air bubbles after dried, 4) good depth in printing, and 5) a releasing property which promotes easier separation of printing paper from its coated surface after transfer-printed.

9 Claims, No Drawings

COATING RESIN COMPOSITION FOR TRANSFER PRINTING

BACKGROUND OF THE INVENTION

1. Field of the Invention

The present invention relates to an epoxy-based coating resin composition which facilitates the transcription of the printed letters or photographs developed by sublimation dyes on printing paper to the surface of potteries, glasses, marbles, metals or woods only by thermal treatment and more particularly, to the epoxy-based coating resin composition with 1) long-term storage stability due to the use of a mixture, of diethanolamine and triethanolamine as a hardening accelerator, 2) good depth in the transfer printing, and 3) a releasing property which promotes easier separation of printing paper from its coated surface after transfer-printed.

2. Description of the Related Art

It has been generally known that an epoxy-based resin composition containing a hardening agent is effective to transcribe the printed letters or photographs developed by sublimation dyes on printing paper to a coating layer by thermal treatment[Ger. Pat. No. 2,424,949(1974)]. A mixture of acryl and melamine resin as a coating layer was used to transcribe the printed letters or photographs developed by sublimation dyes on printing paper to aluminum pipes. An epoxy resin was finally coated [Jap. Pat No. 119,006(1979)].

A coating layer was required to transcribe the printed letters or photographs developed by sublimation dyes on printing paper to the surfaces of potteries, glasses, marbles, metals or woods, etc. It provided a rapid decoration with printed letters, patterns or photographs to the surface of potteries, glasses, marbles, metals or woods only by thermal treatment. In order to get a good transfer printing, the printed letters or photographs developed by sublimation dyes on printing paper was used. Then, it is necessary to get uniform thickness of a coating layer to be transfer-printed.

The essential properties of coating resin compositions used in transcribing the printed letters or photographs developed by sublimation dyes on printing paper to the coated surface are required as follows:

1. It must provide a coating layer with good transparency, chemical and water resistance, and good adhesion between original surfaces and its coated ones, etc.
2. It must provide both good flexibility to prevent the coating layer from cracking caused by thermal contraction when dried and the ability to restrain the transcribed letters or photographs from discoloring by ultraviolet lights or air.
3. It must produce a coating layer with initial and durable adhesive strength in the condition that the printed letters or photographs developed by sublimation dyes on printing paper are deeply transfer-printed only by thermal treatment.
4. It must promote easier separation of printing paper from the coated layer printing after the thermal treatment.
5. It must provide long-term storage stability at room temperature on the condition that hardening agents are in a same vessel.

Most of epoxy resins existed in the coating resin composition for transfer printing are bisphenol- or phenol-formaldehyde resin with oxirane rings, wherein their epoxide equivalent weight(EEW) is in the range of 180–3300. If EEW in the epoxy resins is below 220, the viscosity of the resins in a liquid state shows in the range of 2–230 poise, while if EEW exceeds 220, most of the resins are in a solid state.

A coating resin composition used in the transfer printing contains some kinds of hardening agents for its curing, and the resin composition containing the agents is unstable even at room temperature. Nevertheless, it is always necessary to enhance the strength, flexibility and heat resistance of the coating layer. The agents used here are amines, acid anhydrides, imidazoles and ureaformaldehyde resins, etc.

Also, in order to control the thickness of the coating layer, various organic solvents as a diluent are used. The weight ratio of aliphatic component to aromatic one as well as the molecular weight distribution in the resin composition is adjusted to get the flexibility of coating layer.

Tertiary amines[J. Appl. Polym. Sci., 10, 1813 (1770)], esters of boric. acid[Polym. Eng. Sci., 16, 353 (1976)], lewis acids[US. Pat. No. 5,521,011(1996)], organometallic compounds[J. Polym. Sci. C., 23, 765 (1968)], organic acid metallic,: salts[J. Polym. Sci. A-1., 8, 593 (1970)] and imiidazoles[J. Appl. Polym. Sci., 11, 1009 (1967)] are used to promote a hardening reaction.

SUMMARY OF THE INVENTION

A coating resin composition with physical properties above-mentioned has been achieved by this invention. As a result, an epoxy-typed resin composition containing a mixture of triethanolamine and diethanolamine as a hardening agent and various organic solvents as diluent together is prepared: a coating layer obtained from the resin composition is used to transcribe the printed letters or photographs developed by sublimation dyes on printing paper to the surfaces of potteries, glasses, marble, metals or woods only by thermal treatment.

DETAILED DESCRIPTION OF THE INVENTION

A coating resin composition for transfer printing containing an epoxy resin, a hardening agent, a hardening accelerator and various organic solvents, is characterized by using a mixture of triethanolamine and diethanolamine as a hardening accelerator.

Detailed description of the invention is as follows.

The present invention relates to a coating resin composition which is possible to transcribe the printed letters or photographs developed by sublimation dyes on printing paper to the surface of potteries, glasses, marbles, metals or woods only by thermal treatment: the resin composition contains a mixture of diethanolamine and triethanolamine as a hardening accelerator. Thus, it brings about long-term storage stability at room temperature and a releasing property that promotes easier separation of printing paper from its coated layer.

The quantity of an epoxy resin, a hardening agent and the hardening accelerator that is solidified by a hardening reaction of above resin composition is used within 10–50 parts in weight. If it is less than 10 parts in weight, the coating layer is too thin to transcribe. But in the quantity more than 50 parts in weight, it is difficult to get a uniform transfer printing to the coating layer.

An epoxy resin existed in the coating resin composition is one or more selected from glycidylates of bisphenol, phenol, phenol-formaldehyde resin or dicarboxylic acid (e.g. phthalic acid, tetrahydrophthalic acid, hexahydrophthalic acid and p-hydroxybenzoic acid). Its molecular weight, epoxy equivalent weight, viscosity, color number, and softening point are selected based on the physical properties of a coating layer above-required. In order to increase the strength of coated layer, an aromatic epoxy resin with high molecular weights is used, while an aliphatic epoxy resin with higher epoxy equivalent weight and relatively low molecular weight is used to get the flexibility of coated layer. The epoxy equivalent weight of epoxy resin used in this invention is in the range of 180–3300.

Amine-typed hardening agents used in this invention are polyamine compounds such as hexamethylene diamine, diethylenetriamine, triethylenetetramine, tetraethylenepentamine, bis(oxamethylene)triamine, trimethyhexamethylenediamine, diethylaminopropylamine, bezenediamine, isopropyondiamine, bis(4-amino-3-methylcyclohexyl)methane, N-aminoethylpiperidine, m-phenylenediamine, diaminophenylmethane or diaminophenylsulfone, etc.; modified amines are epoxy resin products added to polyamine, ethyleneoxide or propyleneoxide products added to polyamine, cyanoethylated polyamine, N,N'-dimethylpiperidine, 2-(dimethylamineomethyl)phenol and 2,4,6,-tris(dimethylaminomethyl)phenol, etc. Anhydride-typed hardening agents are phthalic anhydride, trimellitic anhydride, pyromellitic dianhydride, benzophenone tetracarboxylic dianhydride, ethylene glycol bis(anhydrotrimellitate), glycerol tris(anhydrotrimellitate), maleic anhydride, succinic anhydride, tetrahydrophthalic anhydride, methyltetrahydrophthalic anhydride, nadicmethyl anhydride, alkenlsuccinic anhydride, hexahydrophthalic anhydride, methylhexahydrophthalic anhydride or methylcyclohexene tetracarboxylic dianhydride etc. Imidazole-typed hardening agents are 1-cyanoethyl-2-ethyl-4-methylimidazole, 1-cyanoethyl-2-phenylimidazollium trimellitate, 2-phenyl4,5-dihydroxydimethylimidazole and 2-phenyl-4-methyl-5-hydroxymethyl imidazole etc. The hardening agent is one or more selected from the agents above-mentioned. The quantity of hardening agents is used 20~80 parts in weight. When the quantity is used in above or below the range, the strength of a coating layer decreases.

Among hardening agents above-mentioned, a coating resin composition containing amine- or imidazole-typed hardening agents doesn't show long-term storage stability at room temperature and makes a soft coating layer after dried: when the resin composition containing acid anhydrides is used, the storage stability at room temperature as well as the hardness of a coating layer is very good.

In this invention, a mixture of diethanolamine and triethanolamine as a hardening accelerator is added to the coating resin composition, and it is helpful to form a coating layer rapidly and to improve the adhesive strength between a coating layer and its coated surface. The mixture is a mixture of triethanolamine and one or more selected from diethanolamine, methyldiethanolamine, ethyldiethanolamine, n-butyldiethanolamine and t-butyldiethanolamine. The quantity of a hardening accelerator can be used within 0.05–5 parts in weight in proportion to 100 parts in weight of an epoxy resin. If it is below 0.05 parts in weight, the hardening time becomes longer and hardness of a coating layer decreases. But in the quantity more than 5 parts in weight, the coating layer is very brittle, due to the generation of a lot of crosslinking reactions.

Further, the weight ratio of diethanolamine to trithanolamine is 0.8–3.5. If the ratio is below 0.8, it is very slow to form a coating layer: the layer is very flexible. But if the ratio is above 3.5, the coating resin composition doesn't show long-term storage stability.

Organic solvents existed in the coating resin are three or more selected from methylethyl ketone, methylisobutyl ketone, ethyl benzene, buthanol, butylcellosolve, toluene, xylene, n-butylglycidyl ether, diglycidylether, butandiolglycidyl ether and 4-vinyl-1-cyclohexene diepoxide, etc: various kinds of solvents with different boiling points are used to get a plane surface after mildly dried. But if one or two selected from the various solvents is used, it is difficult to dissolve raw materials completely, and then air bubbles form in some coating layers. Therefore, raw materials in a solid state are completely dissolved by organic solvents used in this invention. Then, the viscosity of the coating resin composition decreases, and also after dried the quantity of air bubble:s found in the coating layer decreases.

According to this invention, nonionic surfactants may be used individually or concurrently for the good mixing, where the homogeneity of a coating resin composition is greatly affected by the kinds and amounts of surfactants. The nonioniic surfactants having HLB(Hydrophilic Lipophilic Balance) value in the range of 9–18 are used; for example, polyethyleneglycol nonylphenylether, polyethyleneglycol octylphenylether, polyethyleneglycol dodesylphenylether, polyethyleneglycol alklarylether, polyethyleneglycol oleylethet, polyethyleneglycol laurylether, polyethyleneglycol alkylphenylether, polyethyleneglycol olefinic acid ether, polyethyleneglycol distearic acid ether, polyethyleneglycol sorbitanmonolaurate, polyethyleneglycol sorbitan-monostearate polyethylene glycolalkyletter, polyoxyethylenelanoline alcohol ether and polyoxyethylene lanoline fatty acid ester. They are used one or a mixture of two. The appropriate amount of the surfactants is below 2 parts in weight of total amount of used organic solvents. But if this amount is more than 2 parts in weight, a lot of air bubbles form in a coating layer.

The coating resin composition prepared in this invention is coated to the surface that is to be transfer-printed at room temperature and dried at 50–180° C. for ⅓–8 hours. The close adherence between one side existed in sublimation dyes on printing paper and another side that is to be transfer-printed is required. Both sides are repeatedly compressed by using a silicon pad at 120–240° C. for ⅙–5 minutes, and then released.

The coating resin composition prepared by the methods above-mentioned has both initial and durable adhesive strength to contacted surface after dried. The printed letters or photographs developed by sublimation dyes on printing paper are deeply transfer-printed on a coating layer only by thermal treatment. After this, it is easy to separate printing paper from the coating layer.

This invention will be explained in more detail by the following examples, but the claims are not limited to these examples.

EXAMPLES 1–7

Comparative Examples 1–16

Based upon the composition as illustrated in the following Table I, epoxy resins (Kookdo chemical Co., Korea;

YD-128, YD-011 YD-017), hardening agents, hardening accelerators, organic solvents and surfactants were charged to a round flask(250 ml) equipped with a stirrer and stirred to get a coating resin composition for 48 20 hours. A target(e.g. a mug) to be transfer-printed is put into the prepared coating resin composition, and then taken out at room temperature. A coated layer is dried and at the same time hardened at 130° C. for 50 minutes. The close adherence between one side existed in sublimation dyes on printing paper and another side that is to be transfer-printed is temporarily maintained by pressure-sensitive polyester tape. Both sides, are repeatedly compressed by using a silicon pad with 60 kgf-cm of force at 200° C. for 1.5 minutes, and then released. After this, the shape, hardness, transfer-printing and chemical resistance of coating layer are examined. A part of the coating layer is put into an alkaline solution for 36 hours, and then its shapes are observed: an alkaline solution for the test of chemical resistance is prepared by dissolving NaOH(3 mol) completely to a mixture of 90% of ethanol and 1 l of distilled water. In relation to above physical properties, the coating layer to be transcribed is estimated: the indication is O for good, Δ for average, X for poor.

TABLE 1a

| | | Item | Example 1 | 2 | 3 | 4 | 5 | 6 | 7 |
|---|---|---|---|---|---|---|---|---|---|
| COMPOSITION (g) | Epoxy resin | YD-128 | 7.2 | 7.2 | 7.2 | 7.2 | 7.2 | 7.2 | 7.2 |
| | | YD-011 | 11.6 | 11.6 | 11.6 | 11.6 | 11.6 | 11.6 | 11.6 |
| | | YD-017 | 2.7 | 2.7 | 2.7 | 2.7 | 2.7 | 2.7 | 2.7 |
| | Hardening agent | Phthalic anhydride | 9.8 | 9.8 | 9.8 | 9.8 | 9.8 | 9.8 | 9.8 |
| | Hardening accelerator | Triethanolamine | 0.50 | 0.40 | 0.35 | 0.30 | 0.27 | 0.25 | 0.23 |
| | | Diethanolamine | 0.50 | 0.60 | 0.65 | 0.70 | 0.73 | 0.75 | — |
| | | n-Butyldiethanolamine | — | — | — | — | — | — | 0.77 |
| | Organic solvent | Methylisobutylketone | 12.6 | 12.6 | 12.6 | 12.6 | 10.6 | — | — |
| | | Ethylbenzene | 7.1 | 7.1 | 7.1 | 7.1 | 7.1 | 10.6 | 10.6 |
| | | Buthanol | 10.0 | 10.0 | 10.0 | 20.0 | 10.0 | 12.0 | 12.0 |
| | | Butylcellosolve | 27.3 | 27.3 | 27.3 | 28.0 | — | 10.7 | 10.7 |
| | | Toluene | 10.7 | 10.7 | 10.7 | — | 10.7 | 7.1 | 7.1 |
| | | Xylene | — | — | — | — | 26.7 | 27.3 | 27.3 |
| | | n-Butyl glycidylether | — | — | — | — | 2.6 | — | — |
| | Surfactant | Polyethyleneglycolnonylphenyl ether | 0.05 | 0.05 | 0.05 | 0.05 | — | — | — |
| | | Polyoxyethylenelanolin alcoholether | — | — | — | — | 0.03 | 0.02 | 0.02 |
| Property | | Shape of composition | O | O | O | O | O | O | O |
| | | Shape of coating layer | O | O | O | O | O | O | O |
| | | Hardness of coating layer | O | O | O | O | O | O | O |
| | | Shape of transfer printing | O | O | O | O | O | O | O |
| | | Chemical resistance | O | O | O | O | O | O | O |

TABLE 1b

| | | Item | Comparative Example 1 | 2 | 3 | 4 | 5 | 6 | 7 | 8 |
|---|---|---|---|---|---|---|---|---|---|---|
| COMPOSITION (g) | Epoxy resin | YD-128 | 7.2 | 7.2 | 7.2 | 7.2 | 7.2 | 7.2 | 7.2 | 7.2 |
| | | YD-011 | 11.6 | 11.6 | 11.6 | 11.6 | 11.6 | 11.6 | 11.6 | 11.6 |
| | | YD-017 | 2.7 | 2.7 | 2.7 | 2.7 | 2.7 | 2.7 | 2.7 | 2.7 |
| | Hardening agent | Phthalic anhydride | 9.8 | 9.8 | 9.8 | 9.8 | 9.8 | 9.8 | 9.8 | 9.8 |
| | Hardening accelerator | Triethanolamine | 0.20 | 0.80 | 0.10 | — | — | 0.40 | 0.40 | 0.40 |
| | | Diethanolamine | 0.80 | 0.20 | 0.90 | — | — | 0.60 | 0.60 | 0.60 |
| | | n-Butyldiethanolamine | — | — | — | — | — | — | — | — |
| | | Diethylenetriamine | — | — | — | 1.0 | — | — | — | — |
| | | m-Phenylenediamine | — | — | — | — | 1.0 | — | — | |
| | Organic solvent | Methylisobutylketone | 22.6 | 22.6 | 22.6 | 22.6 | 22.6 | 22.6 | 22.6 | 10.0 |
| | | Ethylbenzene | 7.1 | 7.1 | 7.1 | 7.1 | 7.1 | 7.1 | 7.1 | 7.1 |
| | | Xylene | 20.0 | 15.4 | 20.0 | 20.0 | 10.0 | 10.0 | 10.0 | 15.0 |
| | | Butylcellosolve | 18.0 | 22.6 | 18.0 | 18.0 | 28.0 | 28.0 | 18.0 | 17.6 |
| | | n-Butyl glycidylether | — | — | — | — | — | — | 10.0 | — |
| | | Diglycidylether | — | — | — | — | — | — | — | 18.0 |
| | Surfactant | Polyethyleneglycolnonylphenyl ether | 0.05 | 0.05 | 0.05 | — | — | 3.10 | 0.05 | 0.05 |
| | | Polyoxyethylenelanolin alcoholether | — | — | — | 0.05 | 0.05 | — | — | — |
| Property | | Shape of composition | O | O | O | O | O | O | O | O |

TABLE 1b-continued

|  | Item | Comparative Example | | | | | | | |
|---|---|---|---|---|---|---|---|---|---|
|  |  | 1 | 2 | 3 | 4 | 5 | 6 | 7 | 8 |
|  | Shape of coating layer | Δ | X | Δ | X | X | X | ○ | X |
|  | Hardness of coating layer | X | X | X | Δ | Δ | X | X | X |
|  | Shape of transfer printing | Δ | X | X | X | X | X | Δ | X |
|  | Chemical resistance | Δ | X | Δ | ○ | Δ | Δ | X | X |

TABLE 1c

|  | Item | | Comparative Example | | | | | | | |
|---|---|---|---|---|---|---|---|---|---|---|
|  |  |  | 9 | 10 | 11 | 12 | 13 | 14 | 15 | 16 |
| COMPOSITION (g) | Epoxy resin | YD-128 | 7.2 | 7.2 | 7.2 | 7.2 | 7.2 | 21.4 | 3.6 | 12.2 |
|  |  | YD-011 | 11.6 | 11.6 | 11.6 | 11.6 | 11.6 | — | 5.8 | 19.7 |
|  |  | YD-017 | 2.7 | 2.7 | 2.7 | 2.7 | 2.7 | — | 1.4 | 4.6 |
|  | Hardening agent | Phthalic anhydride | 9.8 | 9.8 | 4.0 | — | 9.8 | 9.8 | 4.9 | 14.1 |
|  |  | Triethylenetetraamine | — | — | 5.8 | — | — | — | — | — |
|  |  | 2-Phenyl-4-methyl-5-hydoxymethylimidazole | — | — | — | 9.8 | — | — | — | — |
|  | Hardening accelerator | Triethanolamine | 0.40 | 0.40 | 0.40 | 0.40 | 1.60 | — | 0.04 | 0.60 |
|  |  | Diethanolamine | 0.60 | 0.60 | 0.60 | 0.60 | 2.40 | — | 0.04 | 0.90 |
|  | Organic solvent | Methylisobutylketone | 22.6 | — | 22.6 | 22.6 | 21.6 | 22.9 | 28.8 | 13.0 |
|  |  | Ethylbenzene | — | — | 7.1 | 10.0 | 6.1 | 7.4 | 9.2 | 6.9 |
|  |  | Buthanol | 7.1 | — | 10.0 | 7.1 | 10.0 | 10.0 | 20.0 | — |
|  |  | Butylcellosolve | 38.0 | — | 28.0 | 28.0 | 27.0 | 28.4 | 26.2 | 28.0 |
|  |  | Toluene | — | — | — | — | — | — | — | — |
|  |  | Xylene | — | 67.7 | — | — | — | — | — | — |
|  | Surfactant | Polyethyleneglycolnonyl-phenyl ether | — | — | 0.05 | — | — | 0.05 | — | — |
|  |  | Polyoxyethylenelanolin alcoholether | 0.02 | 0.03 | — | 0.02 | 0.02 | — | 0.03 | 0.03 |
| Property |  | Shape of composition | ○ | X | X | ○ | X | ○ | ○ | ○ |
|  |  | Shape of coating layer | Δ | X | Δ | ○ | X | X | Δ | X |
|  |  | Hardness of coating layer | ○ | ○ | Δ | ○ | ○ | ○ | ○ | ○ |
|  |  | Shape of transfer printing | Δ | Δ | X | X | Δ | X | Δ | Δ |
|  |  | Chemical resistance | ○ | ○ | X | ○ | ○ | ○ | ○ | ○ |

According to this invention, a coating resin composition used in the transfer printing showed good physical properties as shown in Table 1a. On the contrary, comparative examples [e.g. the weight ratios of diehthanolamine to triethanolamine above or below the range in this invention (comparative examples 1-3), the use of other kinds of arnines (comparative examples 4 and 5), the excess use of surfactaits (comparative example 6), the excessive use of organic solvents (comparative examples 7 and 8), the use of a kind solvent or some solvents with similar boiling points (comparative examples 9 and 10), the use of a hardening agent without storage stability at room temperature (comparative examples 11 and 12), the excessive use of a hardening accelerator without storage stability(comparative example 13), the use of a kind of epoxy resin and the use of epoxy resins less or more required (comparative examples 14–16)] showed poor physical properties as shown in Table 1b and 1c.

As described above, the coating resin composition for transfer printing in, the present invention showed excellent properties in 1) long-term storage stability due to a mixture of diethanolamine and triethanolamine, 2) uniform thickness after coated, 3) less air bubbles after dried, 4) good depth in the printing, and 5) a releasing property which promotes easier separation of printing paper from its coated surface after transfer-printed.

Besides, sublimation dyes on printing paper were efficiently transfer-printed on a coating layer only by thermal treatment: it was found that the strength, flexibility, chemical resistance and transparency of transfer-printed layer were very good.

What is claimed is:

1. A coating resin composition for transfer printing containing an epoxy resin, a hardening agent, a hardening accelerator and various organic solvents, is characterized by using a mixture of triethanolamine and diethanolaminc as a hardening accelerator.

2. The coating resin composition for transfer printing according to claim 1, wherein the mixture is a mixture of triethanolamine and one or more selected from diethanolamine, methyldiethanolarnine, ethyldiethanolamine, n-butyldiethanolamine and t-butyldiethanolamine.

3. The coating resin composition for transfer printing according to claim 1, wherein the weight ratio of diethanolamine to triethanolamine in the mixture is in the range of 0.8–3.5.

4. The coating resin composition for transfer printing according to claim 1, wherein the quantity of hardening accelerator is 0.05–5 parts in weight in proportion to 100 parts in weight of epoxy resin.

5. The coating resin composition for transfer printing according to claim 1, wherein the epoxy resins are glycidylates of phenol/bisphenol resin, phenol-formaldehyde or dicarboxylic acids: the quantity of e.poxy equivalent weight is in the range of 180–3300.

6. The coating resin composition for transfer printing according to claim 1, wherein the hardening agent is one or more selected from plhthalic anhydride, trimellitic anhydride, piromellitic dianh,ydride, benzophenonetetracarboxylic dianhydride, ethyleneglycol ditrirn(,litate, glycerol tritrimellitate, malleic anhydride. succinic anhydride, tetrahydrophthalic anhydride, methyltetrrhydrophthalic anhydride, methylnardic anhydride, alkenylsuccinic anhydride, hexahydrophthalic anhydride, methylhexahydrophthalic anhydride and methylcyclohexene tetracarboxylic dianhydride, etc.

7. The coating resin composition for transfer printing according to claim 1, wherein the quantity of the hardening agent is 20–80 parts in weight in proportion to 100 parts in weight of the epoxy resins.

8. The coating resin composition for transfer printing according to claim 1, wherein organic solvents are a mixture of more than three selected from methylethyl ketone, methylisobutyl ketone, ethylbenzene, butanol, butylcellosolve, toluene, xylene, n-butylglycidyl ether, diglycidyl ether, butanedioldiglycidyl ether and vinylcyclohexenedioxide.

9. The coating resin composition for transfer-printing according to claim 1, wherein the quantity of epoxy resins, hardening agents and hardening accelerators which is solidified by a hardening reaction is added within 10–50 parts in weight for total amount of raw materials used.

* * * * *

UNITED STATES PATENT AND TRADEMARK OFFICE
CERTIFICATE OF CORRECTION

PATENT NO. : 6,333,369 B1
DATED : December 25, 2001
INVENTOR(S) : In-Hwan Park et al.

Page 1 of 1

It is certified that error appears in the above-identified patent and that said Letters Patent is hereby corrected as shown below:

Column 8, claim 1,
Line 48, change "diethanolaminc" to -- diethanolamine --;

Column 8, claim 2,
Line 53, change "methyldiethanolarnine" to -- methyldiethanolamine --;

Column 8, claim 5,
Line 66, change "e.poxy" to -- epoxy --;

Column 9, claim 6,
Line 3, change "plhthalic" to -- phthalic --;
Line 4, change "dianh,ydride" to -- dianhydride --;
Line 5, change "ditrirn(,litate" to -- ditrimellitate --; and
Line 7, change "methyltetrrhydrophthalic" to -- methyltetrahydrophthalic --

Signed and Sealed this

Sixteenth Day of April, 2002

*Attest:*

JAMES E. ROGAN
*Director of the United States Patent and Trademark Office*

*Attesting Officer*